April 26, 1966 J. K. GALT 3,248,712

MEMORY ELEMENT

Filed Oct. 12, 1961

INVENTOR
J. K. GALT
BY [signature]
ATTORNEY

United States Patent Office 3,248,712

Patented Apr. 26, 1966

3,248,712

MEMORY ELEMENT

John K. Galt, Berkeley Heights, N.J., assignor to Bell Telephone Laboratories, Incorporated, New York, N.Y., a corporation of New York Filed Oct. 12, 1961, Ser. No. 144,699
3 Claims. (Cl. 340—173.1)

Figure 1:
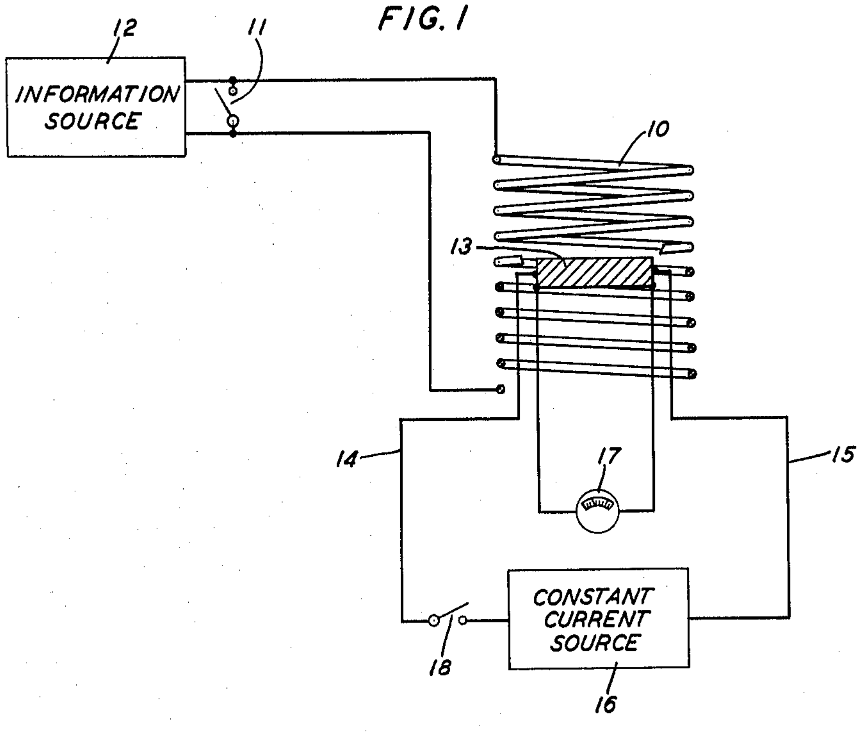

This invention relates to analogue memory devices. More particularly, it relates to an effective and efficient means for reading analogue magnetic memory elements.

According to this invention, intelligence is stored in a retentive magnetic element and is interrogated at a desired instant with the novel means of this invention. This read-out device comprises essentially a bismuth crystal interposed in the magnetic field of the storage element which accurately reflects the magnitude of the magnetic flux of the storage current through the magnitude of its own resistance. This magnetoresistive effect is very pronounced and varies widely over relatively small ranges of magnetic field strength. Since the magnetoresistive response in bismuth is restricted to a temperature range of below 20° K., this invention is particularly adapted to the combination including a low temperature magnetic storage element, for instance, a superconductive coil.

Figure 2:
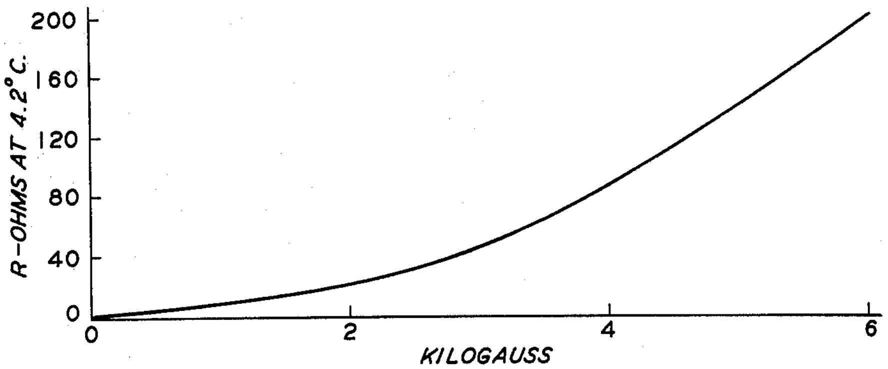

These and various other aspects of this invention may become apparent from the drawing in which:

FIG. 1 is a schematic diagram of a typical readout device according to this invention in combination with a superconductive storage element; and FIG. 2 is a plot of the field strength in the storage element of FIG. 1 vs. the resistance of a typical bismuth crystal at the temperature of liquid helium.

FIG. 1 shows an appropriate magnetic storage element comprising a superconductive coil 10 interrupted by a superconducting switch 11. Information is injected into the coil through switch 11 from the information source 12. A bismuth crystal 13 is placed in the field of the coil 10. Leads 14 and 15 are attached to the bismuth body and connected to a variable stabilized current source 16. Across leads 14 and 15 is a sensitive voltage indicator 17 which, for a given current value of source 16, will effectively read resistance variations in the bismuth body. The current source 16 is made variable to allow for adjustment of the power load across the bismuth element to a permissible range of below 1/10 watt to prevent excessive heating of the bismuth body. Switch 18 is connected in the read-out circuit permitting the interrogation of the stored magnetic charge at a desired instant. In theory the charge will remain in the coil for an infinite period thus enabling extremely long effective read-out periods. The entire apparatus is preferably maintained in a cryostat (not shown) of a character well known in the art for maintaining the superconducting coil and the bismuth element at the desired temperature. The information introduced across the switch 11 may be in the form of a current pulse sample of a continuous information source or may be merely pulsed signals as used in ordinary threshold or analogue-threshold logic. The current pulse introduced into superconductive coil 10 gives rise to a magnetic field which is read out at the desired instant by reading the resistance of the bismuth body at indicator 17.

The current values and resultant magnetic field values are dependent in part on the construction of the superconductive coil 10 and the magnetic coupling coefficient between the coil and the bismuth body. Assuming for simplicity a coil of infinite length the relationship may be approximated as:

$$H=0.4\pi NI \qquad (1)$$

where H is the field strength in gauss, N is the number of turns in the coil, and I is the current in amperes.

The relationship between the field strength of the coil and the resistance of a typical bismuth single crystal is shown in FIG. 2. This particular sample has a 0° C. resistance of 0.1 ohm with dimensions of 0.1 mm. x 0.1 mm. x 10 cm. As is seen from the figure the resistance variation with field strength is not linear but varies approximately as the square of the field strength.

The bismuth element according to this invention is preferably a single crystal body; however, significant and useful effects can be obtained with polycrystalline bismuth.

To obtain the maximum resistance variation with field strength the current flow in the bismuth element must be perpendicular to the field of the coil. Minor deviations from this requisite will still yield useful results.

In general, impurities in the bismuth element are to be avoided since they give rise to crystal imperfections which destroy the magnetoresistive effect. However, certain alloy compositions which possess high crystalline uniformity are useful as read-out elements according to this invention. Worthy of specific mention are the antimony-bismuth alloys disclosed in application Serial No. 69,743 filed November 16, 1960 and now Patent No. 3,136,134, which are particularly suited for the purposes of the invention. These alloy compositions include 3–40% Sb, balance bismuth.

A significant advantage of the device of this invention is the non-destructive character of the interrogation. This allows for repeated readings of the same information over extended time periods.

It will be apparent that use of this device will ordinarily require arrays of these elements connected in known circuit arrangements according to the desired function. Such arrays could perform either digital or analogue functions.

The size of the bismuth element is not a critical feature. It can be varied according to the size of the coil necessary to achieve the desired field strengths or to provide higher or lower resistance values.

As previously pointed out the bismuth element must be maintained at temperatures below 20° K. and thus, this invention is particularly well adapted to use in combination with superconducting storage elements such as Nb, $Nb_3Sn$ or NbZr. However, it is to be understood that this invention is effective in combination with any magnetic storage elements, such as ferrimagnetic elements.

The crystal orientation of the bismuth body is also not critical since the magnetoresistive response of bismuth is not very anisotropic.

Various other modifications and extensions of this invention will become apparent to those skilled in the art. All such variations and deviations which basically rely on the teachings through which this invention has advanced the art are properly considered within the spirit and scope of this invention.

What is claimed is:

1. An analogue memory element comprising, in combination, a magnetic storage element capable of storing magnetic charges of several flux densities, and a read-out body comprising bismuth, said body having associated therewith cooling means for maintaining the body below 20° K., the said combination arranged such that the magnetic storage element is adapted to exert several magnetic fluxes on the bismuth body thereby producing several resistances in the bismuth body each having a value reflecting the instantaneous magnitude of the magnetic flux, and means for measuring the several resistances in said body.

2. The memory element of claim 1 wherein the magnetic storage element comprises a superconductive coil.

3. The memory element of claim 1 wherein the bismuth body contains antimony in amounts up to 5–40%.

References Cited by the Examiner

UNITED STATES PATENTS

| | | | |
|---|---|---|---|
| 2,938,160 | 5/1960 | Steele | 340—173.1 |
| 2,946,995 | 7/1960 | Kuhrt | 323—94 |
| 2,982,906 | 5/1961 | Green | 323—94 |
| 3,042,852 | 7/1962 | Steele | 340—173.1 |
| 3,042,853 | 7/1962 | Steele | 340—173.1 |

IRVING L. SRAGOW, *Primary Examiner.*